(12) United States Patent
Magnell

(10) Patent No.: US 11,305,505 B2
(45) Date of Patent: Apr. 19, 2022

(54) CONTINUOUS FANFOLDED JOINED CORRUGATED

(71) Applicant: WestRock Shared Services, LLC, Atlanta, GA (US)

(72) Inventor: Greg P. Magnell, Vicksbury, MI (US)

(73) Assignee: WESTROCK SHARED SERVICES, LLC, Atlanta, GA (US)

( * ) Notice: Subject to any disclaimer, the term of this patent is extended or adjusted under 35 U.S.C. 154(b) by 267 days.

(21) Appl. No.: 16/374,491

(22) Filed: Apr. 3, 2019

(65) Prior Publication Data

US 2020/0316898 A1  Oct. 8, 2020

(51) Int. Cl.
*B31B 50/26* (2017.01)
*B32B 1/08* (2006.01)
*B65D 65/40* (2006.01)
*B31D 5/04* (2017.01)

(52) U.S. Cl.
CPC .............. *B31B 50/26* (2017.08); *B31D 5/04* (2013.01); *B32B 1/08* (2013.01); *B65D 65/403* (2013.01)

(58) Field of Classification Search
CPC ......... B31B 50/26; B31B 50/36; B31B 50/48; B31B 50/62; B31B 50/624; B31B 50/98; B31B 2100/0022; B31B 2120/302; B31D 5/0086; B31D 5/04; B32B 1/02; B32B 1/08; B32B 29/00; B32B 29/002; B32B 29/005; B32B 29/08; B65D 65/403
See application file for complete search history.

(56) References Cited

U.S. PATENT DOCUMENTS

| | | | |
|---|---|---|---|
| 4,247,289 A * | 1/1981 | McCabe | F16F 1/3605 493/386 |
| 5,640,835 A | 6/1997 | Muscoplat | |
| 5,882,767 A | 3/1999 | Simmons, Jr. | |
| 2006/0196374 A1 | 9/2006 | Stemmie et al. | |
| 2015/0014205 A1 | 1/2015 | Yap et al. | |
| 2018/0326686 A1 | 11/2018 | Wetsch et al. | |

OTHER PUBLICATIONS

International Search Report from PCT/US20/24457 dated Jun. 25, 2020.

* cited by examiner

*Primary Examiner* — Walter Aughenbaugh
(74) *Attorney, Agent, or Firm* — Neil G. Cohen

(57) ABSTRACT

A bale of stock packaging material includes a continuous tube of paperboard material, the continuous tube of paperboard material being flattened and folded back and forth on itself into a fan-folded bale. The continuous tube of paperboard can be a single piece of paperboard with two opposed edges that are folded to overlap with each other. The paperboard material can include a corrugated layer. The opposed edges can be adhered together to form a single seam that runs lengthwise along the continuous tube of paperboard. The adhesive can be applied between the two edges which can join to form the single seam.

15 Claims, 5 Drawing Sheets

CONTINUOUS FANFOLDED JOINED CORRUGATED

BACKGROUND OF THE INVENTION

1. Field of the Invention

The present disclosure relates to packaging, and more particularly to packaging for shipping such as in e-commerce.

2. Description of Related Art

Shipping needs for e-commerce include considerable volume of packaging used for shipping products. Multiple items can be grouped in a single order, where each individual product is already packaged or does not need its own package. However, in order to economize and ship the products together, they must be packaged together in a single sipping container. In other cases, a product such as a book may be shipped on its own, but it needs a shipping container to protect it during transit.

Fulfillment centers where products are placed in shipping containers match orders with one or more products by size to an appropriate shipping container. Given the large variation in order and products sizes, there must be a large variety of shipping containers in stock. Systems that provide custom-sized shipping packages on an order by order basis can considerably reduce the complications in fulfillment centers.

The conventional techniques have been considered satisfactory for their intended purpose. However, there is an ever present need for improved packaging materials, systems, and methods. This disclosure provides a solution for this need.

SUMMARY OF THE INVENTION

A bale of stock packaging material includes a continuous tube of paperboard material, the continuous tube of paperboard material being flattened and folded back and forth on itself into a fan-folded bale. The continuous tube of paperboard can be a single piece of paperboard with two opposed edges that are folded to overlap with each other. The paperboard material can include a corrugated layer. The opposed edges can be adhered together to form a single seam that runs lengthwise along the continuous tube of paperboard. The adhesive can be applied between the two edges which can join to form the single seam.

The continuous tube of paperboard can have a first and a second set of parallel scores imparted on it such that they extend along the continuous tube parallel to the single seam in a longitudinal direction. The continuous tube of paperboard can include a first panel that includes the joined opposed edges and the single seam, and an opposed second panel connected to the opposite side of the tube from the first panel. The first panel can include the first set of parallel scores, and the opposed second panel can include a second set of parallel scores that can be located on the opposite side of the tube from the first set of parallel scores. Corrugation in the paperboard can be aligned perpendicular to the single seam.

The first end of the continuous tube of paperboard can be open and located on the top of the fan-folded bale, and the second end of the continuous tube of paperboard can be open and can be located on the bottom of the bale.

A system includes a ramp. The system includes two or more rails operatively connected to the ramp. The rails are configured to guide a pair of opposed edges of a web to fold in towards each other and overlap, with a first opposed edge folding underneath a second opposite second edge. The system includes an adhesive applicator is operatively connected to the rails to receive a folded over continuous web. A conveyor can be operatively connected to the adhesive applicator to receive the continuous tube of web. The conveyor can be configured to drive a stock of continuous paperboard, including corrugated paperboard. The system can include a folder operatively connected to the adhesive applicator to receive a continuous One or more skis can be operatively connected between the ramp and the rails. The skis can be configured to create a pair of fold lines running the length of the continuous paperboard. A scoring unit can be operatively connected between the ramp and the rails. The scoring unit can be configured to create scores running down the length of the continuous paperboard. The scoring unit can be a set of rotary slitter scorers.

A method includes folding a flat continuous paperboard stock material into a continuous tube and then folding the continuous tube back and forth on itself to form a fan-folded bale. Folding a flat continuous paperboard stock material can include folding a pair of opposed edges of the continuous paperboard stock material inwards to form a single seam so that the first opposed edge overlaps the second opposed edge. An adhesive can be applied to the second opposed edge so that a single seam is permanently formed when the first opposed edge is pressed into the second opposed edge. The method can include scoring the flat continuous paperboard stock material prior to the folding of the pair of opposed edges. The scoring can be performed by one or more rotary slitter scorer units.

Folding the opposed edges of the flat continuous paperboard stock material can include driving the stock material beneath two or more rails. Each rail can be designated to fold one of the opposed edges inwards. The folding of the opposed edges can be partially completed with one or more ski devices and two or more anvils.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
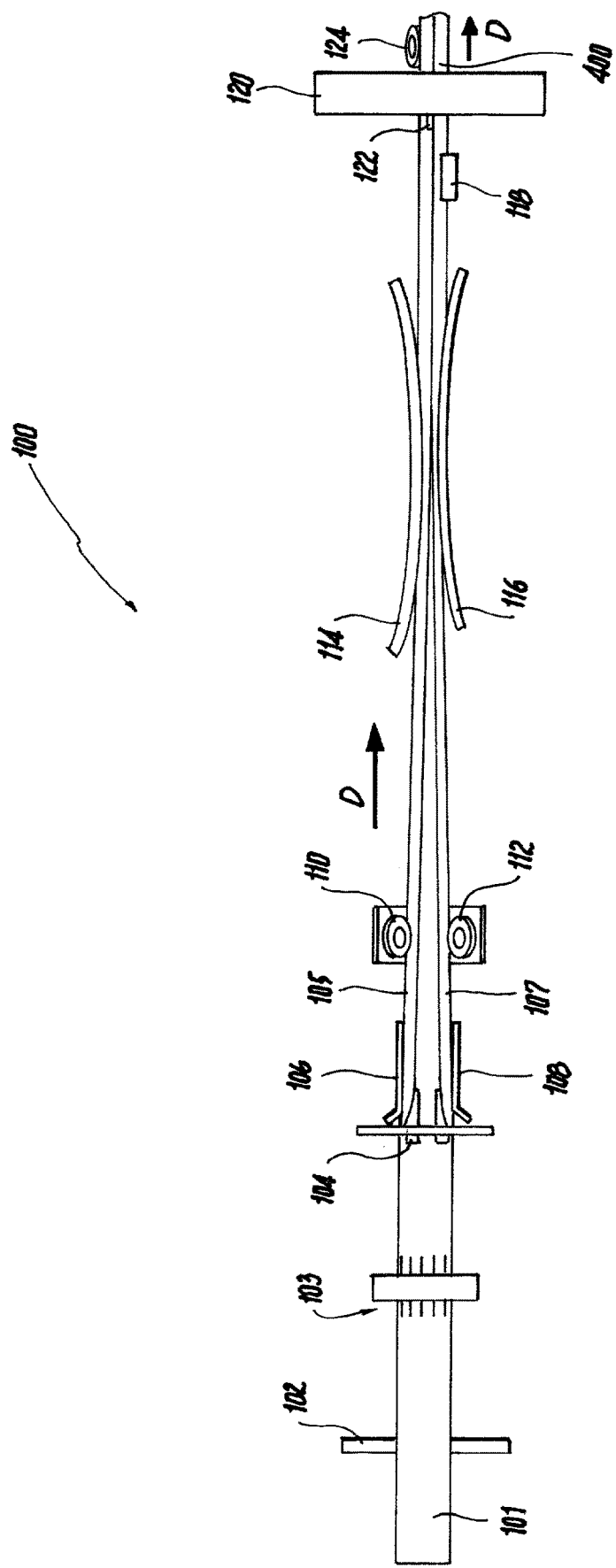
FIG. 1 is a schematic top plan view of a system, showing the elements of the system used to fold and adhere the web substrate into a continuous tube of material.

Reference will now be made to the drawings wherein like reference numerals identify similar structural features or aspects of the subject disclosure. For purposes of explanation and illustration, and not limitation, a schematic of an embodiment of a system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to prepare a bale of continuous stock packaging material.

The system 100 includes a ramp 102 for smoothing and centering the continuous web material 101 as it is introduced to the system 100 to be scored and folded downstream. A scoring unit 103 is operatively connected between the ramp 102 and the pair of rails 114, 116. The scoring unit 103 is configured to create lines of weakness or scores 412, 413 (labeled in FIG. 4) running down the length of the continuous web 101. The scoring unit 103 is optionally a set of rotary slitter scorers. The scores 412, 413 inlaid on the continuous web 101 may be in different orientations than those depicted herein. The continuous web 101 may be pre-scored before use in the system 100. The continuous web 101 may be scored in any number of ways to enable the tube to be folded, assembled, or erected into a general rectangular shape or a simple envelope type shape for packaging and mailing items.

One or more skis 104 are operatively connected to the scoring unit 103. The skis 104 are configured to create fold lines 404, 406 (labeled in FIG. 4) running the length of the continuous web 101. The fold lines 404, 406 are created on scores made by the scoring unit 103 or that were pre-existing in the stock material 128 of continuous web 101. One or more anvils 106, 108 are operatively connected to the skis 104 to aid in the creation of the pair of fold lines 404, 406 running the length of the continuous web 101. One or more wheels 110, 112 are operatively connected to the anvils 106, 108. The wheels 110, 112 are configured to both guide the continuous web 101 to fold inward and position the continuous web 101 for interaction with a set of two or more rails 114, 116. The wheels 110, 112 may be angled in such a manner as to encourage inward folding.

Two or more of rails 114, 116 are operatively connected to the wheels 110, 112. The rails 114, 116 are configured to guide a pair of opposed edges 105, 107 of the web to fold in towards each other and overlap, with the first edge 105 folding underneath the opposite second edge 107. The rails 114, 116 are parabolic or arcuate in shape. The rails may be optionally replaced with plows, belts, channel guides, or any device capable of folding the opposed edges 105, 107 of the web. The rail 114 responsible for folding the first edge 105 begins contact with the continuous web 101 at a point a small distance ahead (e.g., rail 114 is further to the left of the second rail 116 as depicted in FIG. 1). of the point at which the second rail 116 contacts the second edge 107 of the continuous web 101. The arrangement with the first rail 114 contacting the web 101 before the second rail 116 ensures folding of the opposed edges 105, 107, such that the first opposed edge 105 folds down first, followed by the second edge 107, so that they overlap. When viewed in FIG. 2, a schematic side view of the system 100, it can be appreciated that the rails 114, 116 rise a distance off the surface 130 to interface with the continuous web 101. The rails 114, 116 then descend smoothly in order to gently guide the inward folding of the opposed edges 105, 107 to a flattened state.

The system 100 also includes a flattener 118 operatively connected to the rails which applies pressure to one or more of the first edge 105 and the second edge 107 to flatten, smooth and position the folded continuous web prior to its interaction with the adhesive applicator 120. The flattened tube can also be referred to as being in a knock-down format.

An adhesive applicator 120 is operatively connected to receive the flattened continuous web from the flattener 118. The adhesive applicator 120 applies a layer of adhesive 416 (labeled in FIG. 4) to first edge 105 and applies a downward force onto the opposite second edge 107 in order to bond the opposed edges 105, 107 together along a seam 410 to create a continuous flattened tube of web 101, 400 (labeled in FIG. 4). The adhesive applicator includes an adhesive nozzle 122 which is positioned such that it is tucked between the folded first edge 105 and second edge 107 while applying the layer of adhesive 416. A conveyor 124 is operatively connected to the adhesive applier 120. The conveyor 124 is configured to draw the continuous flattened tube of web 101, 400 through the folding and adhesive applications in the direction D. A folder 136 (labeled in FIG. 2) is operatively connected to the conveyor 124. The folder 136 is configured to fold the continuous flattened tube of web 101, 400 (labeled in FIG. 4) back and forth on itself to create a fan-folded bale 136. The folder 136 may be optionally an automated machine, or a station for manual folding.

Figure 2:
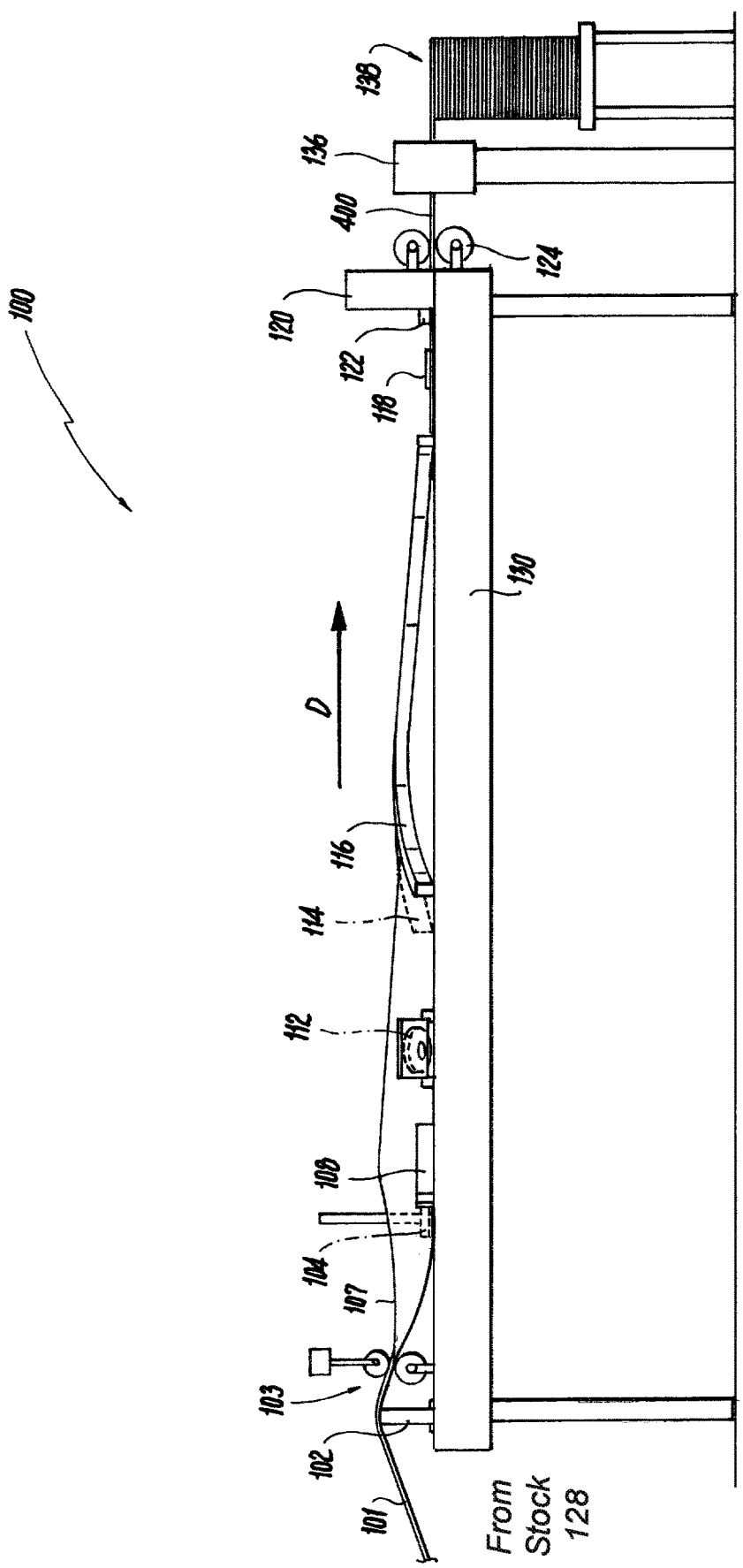
FIG. 2 is a schematic side elevation view of the system constructed in accordance with the present disclosure, showing the elements for folding and adhering a web substrate into a fan-folded bale of a continuous tube of material.

With reference now to FIG. 2, a schematic side view of the system 100 is presented. It should be noted that the scale of the system 100 in FIG. 2 is not necessarily the same as the scale of the system 100 in FIG. 1. The system includes a stock 128 of continuous web 101 material. The stock 128 may be a roll, a bale, or in another format. The system includes a common base 130 on which the system 100 is assembled. The base 130 can be any of length and of any material suitable (e.g., a factory floor, or a platform) for assembling the elements of the present system 100. The schematic depiction of the system 100 of FIG. 2 shows a folder 136 which is configured to fold the continuous flattened tube of web 400 back and forth on itself to create a fan-folded bale 136.

The continuous web 101 can be manually threaded through each of the elements of the system 100 described herein as part of initiating the operation of the system 100.

Figure 3:
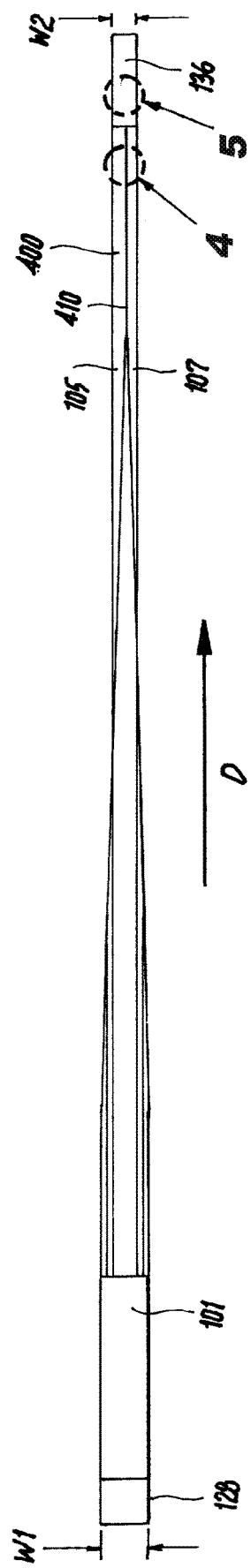
FIG. 3 is a schematic top plan view of the web being treated by the system of FIG. 1, showing the change in width of the web as it is folded by the system.

Now with reference to FIG. 3, the continuous web 101 is depicted being distributed from the stock 128 at a width W1. The continuous web 101 is folded to create the folded continuous web 400 which is width W2, which is a reduced width from W1. The system 100 is not depicted in FIG. 3 so as to schematically illustrate the transformation of the continuous web 101 as it proceeds through the system 100.

Figure 4:
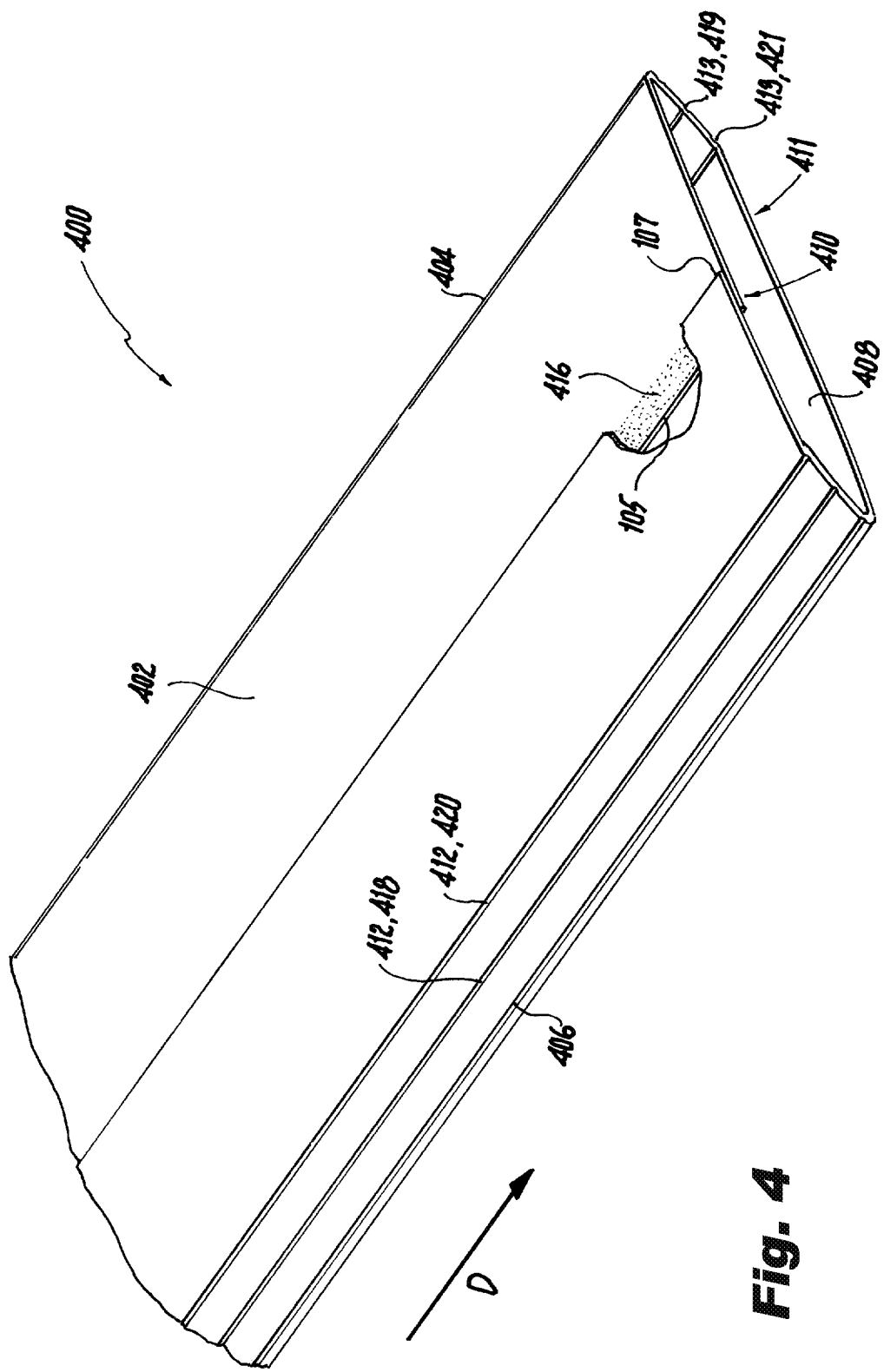
FIG. 4 is a perspective view of an embodiment of a continuous tube of material before it is folded into a bale, showing scoring lines, the opening of the tube, a seam and a place for applying adhesive.

Now with reference to FIG. 4, the continuous flattened tube of web 400 is depicted after its assembly, prior to being folded into a bale 136. The continuous flattened tube of web 400 includes first and second fold lines 404, 406. The end 411 of the continuous flattened tube of web 400 is shown. The leading end 411 of the tube is not adhered closed prior to forming a bale 136. A first and a second panel 402, 408 of the continuous flattened tube of web 400 is shown. The first panel 402 includes the seam 410 formed when the first edge 105 is folded underneath the second edge 107. The continuous flattened tube of web 400 includes the layer of adhesive 416 for keeping the seam adhered. Lines of weakness 412, 413 or scoring marks run parallel to the seam 410 down the length of the continuous flattened tube of web 400. One pair of lines of weakness 412 are included on the first panel 402 of the continuous flattened tube of web 400, and a second pair of lines of weakness 413 are included on the second panel 408, on the opposite side of the tube 400 from the lines of weakness 412 on the first panel 402 (e.g., as oriented in FIG. 4, the lines of weakness 412 on the first panel 402 are on the left, and the lines of weakness 413 on the second panel 408 are on the right). Among the lines of weakness 412, 413, some are included for use as erectable fold lines, 420, 421, and others are included as pleats, 420, 421. The specific number of lines of weakness 412, 413 that may be included is not limited to the depiction of FIG. 4. The lines of weakness included as pleats, 420, 421 may optionally be omitted so that the continuous flattened tube of web 400 may be used in a downstream process to form envelop type packages with no pleats. Alternatively, there may be two or more lines of weakness included as pleats 420, 421 to form packages that have rectangular or accordion-like folds along the sides.

Figure 5:
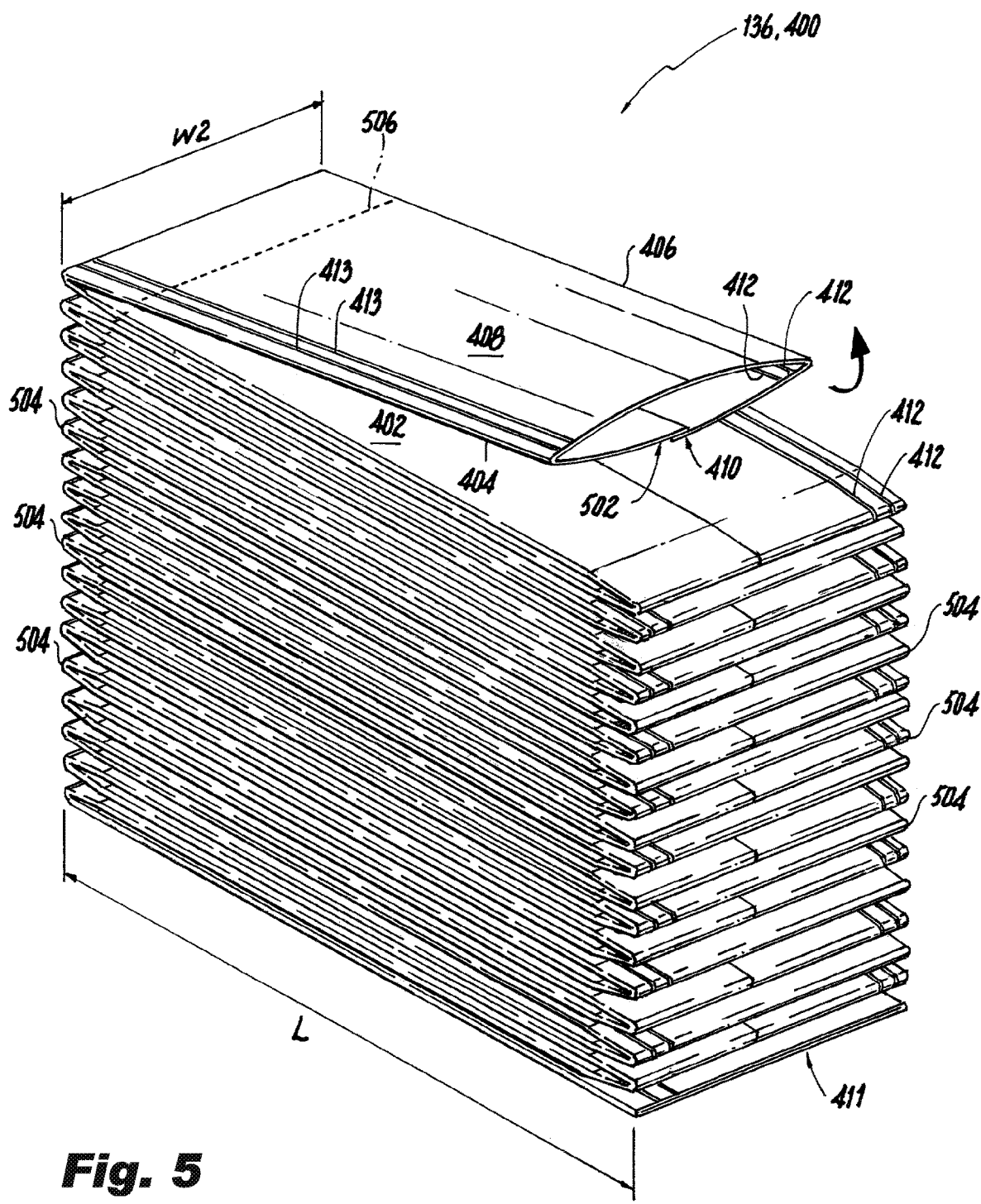
FIG. 5 is a perspective view of an embodiment of a fan-folded bale of a continuous tube of material.

Now with reference to FIG. 5, the fan-folded bale 136 of a continuous flattened tube of web 101, 400 is shown, with the continuous flattened tube of web 400 being folded back and forth on itself. The entire bale 136 is comprised of one unbroken, continuous tube of web 400. A second end 502 is depicted in the bale, with the leading end 411 included on the bottom of the bale 136. The bale 136 is folded at fan-fold lines 504 into a length L in the direction D. The fan-fold lines 504 may optionally match those fold lines established in the stock material 128, and may also follow transverse scores made to the stock material 128 of continuous web 101 before introduction to the system 100. The length L of the bale can be any length that is practicable for a bale 136 of stock material. The seam 410, lines of weakness 412, 413, first fold line 404 and second fold line 406 are shown as they are positioned in the folded bale 136.

The web 101 used in the present invention can be paperboard, solid fiberboard, a corrugated paperboard, or any suitable type of web material used for packaging thereof. Corrugations 506 present in the web material are aligned so as to be perpendicular to the seam 410. The web 101 may be optionally pre-scored prior to introduction to the system 100 to obviate the need for further scoring.

The methods and systems of the present disclosure, as described above and shown in the drawings, provide for a continuous tube of web with superior properties including reproducibility, transportability, durability and reduced cost of production. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bale of stock packaging material comprising:
   a continuous tube of paperboard material, wherein the continuous tube of paperboard material is flattened and folded back and forth on itself into a fan-folded bale.

2. The bale of claim 1, wherein the continuous tube of paperboard material is comprised of a single piece of paperboard with two opposed edges that are folded to be overlapping with each other and adhered together to form a single seam that runs lengthwise along the continuous tube of paperboard material.

3. The bale of claim 2, wherein the paperboard material includes a corrugated layer.

4. The bale of claim 2, wherein the continuous tube of paperboard material includes an adhesive applied between the two edges which join to form the single seam.

5. The bale of claim 2, wherein the continuous tube of paperboard material includes a first and a second set of parallel scores extending parallel to the single seam along a longitudinal direction of the tube.

6. The bale of claim 5, wherein the continuous tube of paperboard material includes a first panel that includes the seam, and an opposed second panel of the tube that is on an opposite side of the tube from the first panel, wherein first panel includes the first set of parallel scores, and the opposed second panel includes the second set of parallel scores which is located on the opposite side of the tube from the first set of parallel scores.

7. The bale of claim 3, wherein the corrugated layer is corrugated with corrugations aligned perpendicular to the single seam.

8. The bale of claim 3, wherein a first end of the continuous tube of paperboard material is open and is located on the top of the fan-folded bale, and a second end of the continuous tube of paperboard material is open and is located on the bottom of the bale.

9. A method comprising:
   folding a flat continuous paperboard stock material into a continuous tube; and
   folding the continuous tube back and forth on itself to form a fan-folded bale.

10. The method as recited in claim 9, wherein folding a flat continuous paperboard stock material includes folding a pair of opposed edges of the continuous paperboard stock material inwards to form a single seam, wherein a first opposed edge overlaps a second opposed edge.

11. The method as recited in claim 10, further comprising an adhesive applied to the second opposed edge such that the single seam is permanently formed when the first opposed edge is pressed into the second opposed edge.

12. The method as recited in claim 10, further comprising scoring of the flat continuous paperboard stock material prior to the folding of the pair of opposed edges.

13. The method as recited in claim 12, wherein scoring is performed by one or more rotary slitter scorer units.

14. The method as recited in claim 10, wherein folding of the opposed edges of the flat continuous paperboard stock material includes driving the stock material beneath two or more rails, wherein each rail is designated to fold one of the opposed edges.

15. The method as recited in claim 10, wherein folding of the opposed edges is partially completed with one or more ski devices and two or more anvils.

* * * * *